United States Patent
Bazzi et al.

(10) Patent No.: US 11,496,343 B2
(45) Date of Patent: Nov. 8, 2022

(54) METHOD FOR DECODING AN RF SIGNAL BEARING A SEQUENCE OF SYMBOLS MODULATED BY CPM AND ASSOCIATED DECODER

(71) Applicant: RIVIERAWAVES, Biot (FR)

(72) Inventors: Ahmad Bazzi, Nice (FR); Lisa Meilhac, Valbonne (FR)

(73) Assignee: RIVIERAWAVES, Biot (FR)

( * ) Notice: Subject to any disclaimer, the term of this patent is extended or adjusted under 35 U.S.C. 154(b) by 0 days.

(21) Appl. No.: 17/467,907

(22) Filed: Sep. 7, 2021

(65) Prior Publication Data

US 2022/0078057 A1    Mar. 10, 2022

(30) Foreign Application Priority Data

Sep. 7, 2020    (EP) ..................... 20315405

(51) Int. Cl.
*H04L 27/20* (2006.01)
*H04B 7/06* (2006.01)

(52) U.S. Cl.
CPC ....... *H04L 27/2014* (2013.01); *H04B 7/0639* (2013.01); *H04B 7/0663* (2013.01)

(58) Field of Classification Search
CPC .............. H04L 27/2014; H04B 7/0639; H04B 7/06663
See application file for complete search history.

(56) References Cited

U.S. PATENT DOCUMENTS

| 7,298,788 B2 | 11/2007 | Seidl |
| 7,421,006 B2 * | 9/2008 | Voglewede ............ H04B 1/713 375/132 |

(Continued)

OTHER PUBLICATIONS

Extended European Search Report issued in corresponding European Application No. 20315405.9, dated Feb. 16, 2021, pp. 1-5, European Patent Office, Munich, Germany.

*Primary Examiner* — Jaison Joseph
(74) *Attorney, Agent, or Firm* — Hauptman Ham, LLP (57) ABSTRACT

A method for decoding an RF signal bearing a sequence of transmitted symbols modulated by CPM. The method includes, at the receiver: estimating model parameters $\{h, \omega, \Phi_0\}$ among which h characterizes a modulation index, $\omega$ characterizes a carrier frequency offset and $\Phi_0$ characterizes an initial phase offset, and detecting received symbols corresponding to said transmitted symbols of the sequence, wherein, at time nT where T is a symbol duration, the parameters $\{h, \omega, \Phi_0\}$ are estimated by solving a system of three linear equations whose: three unknowns $\{\hat{h}^{(n)}, \hat{\omega}^{(n)}, \hat{\Phi}_0^{(n)}\}$ are respectively function of said model parameters $\{h, \omega, \Phi_0\}$, and coefficients $\{B^{(n)}, C^{(n)}, D^{(n)}, F^{(n)}, G^{(n)}, H^{(n)}, v_1^{(n)}, v_2^{(n)}, v_3^{(n)}\}$ are computed in a recursive way in function of: a sequence of symbols $\{\hat{a}_n\}$ corresponding to the sequence of transmitted symbols up to time nT, and measured phases $\{\Psi_k\}$ of samples $\{y_k\}$ of the RF signal received from time (n−1)T to time nT.

20 Claims, 2 Drawing Sheets

(56) References Cited

U.S. PATENT DOCUMENTS

| | | | |
|---|---|---|---|
| 7,676,736 B2* | 3/2010 | Norris | H03M 13/6516 |
| | | | 714/792 |
| 8,243,781 B2 | 8/2012 | Kim et al. | |
| 10,079,699 B1* | 9/2018 | Li | H04L 25/03834 |
| 10,218,551 B1* | 2/2019 | Sethi | H04L 27/2335 |
| 11,356,198 B2* | 6/2022 | Li | H04L 25/03203 |
| 2005/0207474 A1* | 9/2005 | Voglewede | H04L 27/201 |
| | | | 375/132 |
| 2012/0027147 A1* | 2/2012 | Ray | H04L 27/2647 |
| | | | 375/359 |
| 2019/0028322 A1 | 1/2019 | Arditti Ilitzky et al. | |
| 2022/0078057 A1* | 3/2022 | Bazzi | H04L 27/2017 |

* cited by examiner

METHOD FOR DECODING AN RF SIGNAL BEARING A SEQUENCE OF SYMBOLS MODULATED BY CPM AND ASSOCIATED DECODER

FIELD

One or more embodiments of the present invention generally relate to a method for decoding symbols coded by using the so-called CPM (Continuous Phase Modulation) scheme. More specifically one or more embodiments relate to such a method developed for some Bluetooth® standards, and for Bluetooth BR (Basic Rate) and BLE (Bluetooth Low Energy).

BACKGROUND

CPM is widely used in communications for their power and spectral efficiency.

Advantageously, those communications can be easily demodulated using a simple discriminator receiver. This demodulator usually referred to as LDI, is based on a Limiter-Discriminator Integrator. It shows a very low complexity, but suffers from a considerable loss (>6 dB) over the optimal receiver.

On the contrary, the optimal receiver has an extremely high complexity in particular when some impairments/mismatches, such as frequency offset, have to be estimated jointly along with the demodulation.

Bluetooth BR and BLE modulations are based on Gaussian Frequency-Shift Keying (GFSK), this latter being one type of CPM scheme.

It is thus an object of one or more embodiments of the invention to provide a decoding method of an RF signal bearing a sequence of symbols modulated by using CPM, and more particularly GFSK, with a performance gain, for instance of more than 4 dB compared to the LDI demodulator, while restricting complexity, for instance to a linear scale, i.e. to O(n) flops as total complexity per received symbol.

More particularly, in a theoretical way, at the level of the emitter, a GFSK complex baseband signal is in the form:

$$s_{BB}(t) = Ge^{j\Phi(t,h,a)}$$

wherein G is the amplitude of the signal and
wherein $\Phi(t, h, a)$ is the modulated phase carrying the information and is given by:

$$\Phi(t, h, a) = 2\pi h \sum_{i=0}^{\infty} a_i q(t - iT)$$

where T is the symbol duration, $a = \{a_i\}$ is the information sequence, and h is called the modulation index.

Note that, for Bluetooth BR technology, the modulation index varies between 0.27 and 0.35, whereas, for BLE technology, the modulation index is approximatively equal to 0.5.

For instance, the phase pulse q(t) is obtained as the integral of the Gaussian frequency pulse g(t):

$$q(t) = \int_{-\infty}^{t} g(\tau) d\tau$$

As the Gaussian frequency pulse g(t) can be assumed to have a finite duration comprised into the interval [0, LT], the phase pulse q(t) also has a finite length and more particularly q(t)=½ if t>LT. For instance, L is equal to 3 for Bluetooth BR technology.

Owing to the time-limited property of the phase pulse q(t), the modulated phase can be expressed as:

$$\Phi(t,h,a) = \pi h \sum_{i=-\infty}^{n-L} a_i + 2\pi h \sum_{i=n-L+1}^{n} a_i q(t-iT)$$
for $nT \le t \le (n+1)T$ where the first term is the accumulated phase up to the time (n−L) T.

By further writing $\delta_{n-L} = \sum_{i=-\infty}^{n-L} a_i$, the modulated phase can be expressed as:

$$\Phi(t,h,a) = \pi h \delta_{n-L} + 2\pi h \sum_{i=0}^{L-1} a_{n-i} q(t-(n-1)T)$$
for $nT \le t \le (n+1)T$ Already in a theoretical way, at the level of the receiver, taking into account the real world anomalies, the continuous time received signal can be expressed in the form:

$$y(t) = Ae^{j\Phi(t,h,a)+j\omega t+j\theta_0} + i(t) + w(t)$$

Where:
i. $\theta_0$ is an initial phase offset,
ii. $\omega$ corresponds to a Carrier Frequency Offset (CFO),
iii. w(t) corresponds to background noise and can be assumed to obey a zero-mean Gaussian process with variance $\sigma^2$ so that the ratio $$\frac{A^2}{\sigma^2}$$

is a possible measure of the Signal-to-Noise Ratio (SNR), and
iv. i(t) is an interfering signal.

If an interferer/jammer is part of a BT (Bluetooth Technology) packet, the interfering signal can for instance be expressed in the following form: $i(t) = Be^{j\epsilon(t)}$, where $\epsilon(t)$ is another GFSK signal representing an interferer/jammer and so that the ratio $$\left(\frac{A}{B}\right)^2$$

is a possible measure of the co-channel Channel-to-Interfering Ratio (CIR).

Let's call Ts the sampling time period of the continuous time signal y(t) as received by the receiver.

The continuous time signal y(t) is sampled at the frequency fs=1/Ts=M/T where M is the oversampling factor and T is the symbol duration. Then, the samples received during the symbol duration T of the $n^{th}$ symbol may be expressed in the following form:

$$y(kTs) = y_k = Ae^{j(\Phi_k(h)\Phi_0+\omega kTs)} + i_k + w_k$$

wherein $$\Phi_k(h) = \pi h \delta_{n-L} + 2\pi h \sum_{i=0}^{L-1} a_{n-i} q(kTs-(n-i)T)$$
for $nM \le k \le (n+1)M$.

By using vector notations, we obtain:

$$\Phi_n = \pi h \delta_{n-L} 1 + 2\pi h \sum_{i=0}^{L-1} a_{n-i} q_i$$

wherein $$\Phi_n = [\Phi_{nM} \Phi_{nM+1} \ldots \Phi_{nM+(M-1)}]^T \text{ and}$$

$$q_i = [q(iT) q(iT+Ts) \ldots q(iT+(M-1)Ts)]^T.$$

In view of the preceding, it is a further object of one or more embodiments of the invention to estimate the set of variables and parameters $\{a_1, \ldots, a_n, h, \omega, \Phi_0\}$ which is subject to minimum latency, minimum Mean Squared Error (MSE) and maximum robustness against interferences, with received samples $\{y_1, \ldots, y_{(n+1)M}\}$ being given.

Further objects, features and advantages of one or more embodiments of the present invention will become apparent to the ones skilled in the art upon examination of the following description in reference to the accompanying drawings. It is intended that any additional advantages be incorporated herein.

SUMMARY OF THE INVENTION

According to a first aspect, one or more embodiments of the invention relate to a method for decoding an RF signal bearing a sequence of transmitted symbols modulated by using continuous phase modulation, the method comprising, at the level of a receiver of said RF signal:

Estimating model parameters $\{h, \omega, \Phi_0\}$ among which a first parameter h characterizing a modulation index, a second parameter $\omega$ characterizing a carrier frequency offset and a third parameter $\Phi_0$ characterizing an initial phase offset, and Detecting, within the received RF signal, received symbols corresponding to said transmitted symbols of the sequence, wherein, at time nT where T is a symbol duration and n ∈ N, the parameters $\{h, \omega, \Phi_0\}$ are estimated by solving a system of three linear equations whose:

a. three unknowns $\{\hat{h}^{(n)}, \hat{\omega}^{(n)}, \hat{\Phi}_0^{(n)}\}$ are respectively function of said model parameters $\{h, \omega, \Phi_0\}$ to be estimated, and b. coefficients $\{B^{(n)}, C^{(n)}, D^{(n)}, F^{(n)}, G^{(n)}, H^{(n)}, v_1^{(n)}, v_2^{(n)}, v_3^{(n)}\}$ are computed in a recursive way in function of:
  i. a sequence of symbols $\{\hat{a}_n\}$ corresponding to the sequence of transmitted symbols up to time nT, and
  ii. measured phases $\{\Psi_k\}$ of samples $\{y_k\}$ of the RF signal received from time $(n-1)T$ to time nT.

The method according to its first aspect is a computer-implemented method.

As shown by the simulation results discussed below with reference to FIGS. 2 and 3, the method as introduced above allows a performance gain compared to the LDI demodulator, while restricting complexity on a linear scale per received symbol. It allows estimating the set of variables and parameters $\{a_1, \ldots, a_n, h, \omega, \Phi_0\}$ with minimum latency, minimum Mean Squared Error (MSE) and maximum robustness against interferences.

According to an embodiment, and in accordance with the formalism as introduced into the "background" part, the system of three linear equations is in the following matrix form:

$$\begin{bmatrix} \hat{\omega}^{(n)} \\ \hat{\Phi}_0^{(n)} \\ \hat{h}^{(n)} \end{bmatrix} = \begin{bmatrix} B^{(n)} & C^{(n)} & D^{(n)} \\ F^{(n)} & G^{(n)} & B^{(n)} \\ G^{(n)} & H^{(n)} & C^{(n)} \end{bmatrix}^{-1} \begin{bmatrix} v_1^{(n)} \\ v_2^{(n)} \\ v_3^{(n)} \end{bmatrix}$$

with the matrix coefficients being in the form:

$B^{(n)} = \Sigma_{k \in I(n)} k \alpha_k r_k$ or $B^{(n)} = B^{(n-1)} + \Sigma_{k \in I(n) \setminus I(n-1)} k \alpha_k r_k$ $C^{(n)} = \Sigma_{k \in I(n)} \alpha_k r_k$ or $C^{(n)} = B^{(n-1)} + \Sigma_{k \in I(n) \setminus I(n-1)} \alpha_k r_k$ $D^{(n)} = \Sigma_{k \in I(n)} \alpha_k^2 r_k$ or $D^{(n)} = B^{(n-1)} + \Sigma_{k \in I(n) \setminus I(n-1)} \alpha_k^2 r_k$ $F^{(n)} = \Sigma_{k \in I(n)} k^2 r_k$ or $F^{(n)} = B^{(n-1)} + \Sigma_{k \in I(n) \setminus I(n-1)} k^2 r_k$ $G^{(n)} = \Sigma_{k \in I(n)} k r_k$ or $G^{(n)} = B^{(n-1)} + \Sigma_{k \in I(n) \setminus I(n-1)} k r_k$ $H^{(n)} = \Sigma_{k \in I(n)} |y_k|$ or $H^{(n)} = B^{(n-1)} + \Sigma_{k \in I(n) \setminus I(n-1)} |y_k|$ $v_1^{(n)} = \Sigma_{k \in I(n)} \alpha_k r_k \Psi_k$ or $v_1^{(n)} = v_1^{(n-1)} + \Sigma_{k \in I(n) \setminus I(n-1)} \alpha_k r_k \Psi_k$ $v_2^{(n)} = \Sigma_{k \in I(n)} k r_k \Psi_k$ or $v_2^{(n)} = v_2^{(n-1)} + \Sigma_{k \in I(n) \setminus I(n-1)} k r_k \Psi_k$ $v_3^{(n)} = \Sigma_{k \in I(n)} r_k \Psi_k$ or $v_3^{(n)} = v_3^{(n-1)} + \Sigma_{k \in I(n) \setminus I(n-1)} r_k \Psi_k$ where I(n) is a subset of indices between 0 and nM, $r_k$ is equal to one chosen among $|y_k|$ and a user defined constant, and $\alpha_k$ is in the form:

$\alpha_k = \pi \Sigma_{i=0}^{n-L} \hat{a}_i + 2\pi \Sigma_{i=1}^{L-1} \hat{a}_{n-1} q(kT_s + iT - nT)$
with $nM \leq k \leq (n+1)M$ It is thus provided a decoding method that is able to estimate the model parameters in a recursive manner.

According to an advantageous embodiment, an $(m+1)^{th}$ received symbol is detected by:

computing a predicted phase $\Gamma_m$ of the RF signal received from time mT to time $(m+1)T$ in function of a sequence of $\{\hat{a}_m\}$ corresponding to the sequence of transmitted symbols up to time mT and in function of the unknowns $\{\hat{h}^{(m)}, \hat{\omega}^{(m)}, \hat{\Phi}_0^{(m)}\}$ as estimated at time mT, and measuring phases $\{\Psi_k\}$ of samples $\{y_k\}$ of the RF signal received from time mT to time $(m+1)T$, then computing an error term between a vector $\Psi_m$ of the measured phases $\{\Psi_k\}$ and said predicted phase $\Gamma_m$ in order to match both phases.

According to the latter advantageous embodiment, and in accordance with the formalism as introduced into the "background" part:

a. The predicted phase $\Gamma_n$ is in the following form:

$\Gamma_n = \pi \hat{h}^{(n)} \hat{\delta}_{n-L} 1 + 2\pi \hat{h}^{(n)} \Sigma_{i=1}^{L-1} \hat{a}_{n-i} q_i + \hat{\Phi}_0^{(n)} + \hat{\omega}^{(n)} c_n$ with $$\hat{\delta}_{n-L} = \sum_{i=0}^{n-L} \hat{a}_i = \hat{\delta}_{n-L-1} + \hat{a}_{n-L}$$

b. The $n^{th}$ received symbol as detected is given by:

$\hat{a}_n = \text{sign}(p_n^T [\Psi_n - \Gamma_n + \rho_n \Omega_n])$ where:

$\Psi_n = \text{angle}([y_{nM}\, y_{nM+1} \cdots y_{nM+(M-1)}]^T) = [\Psi_{nM}\, \Psi_{nM+1} \cdots \Psi_{nM+(M-1)}]^T$, $\Omega_n = [(\Phi_{nM} - \Phi_{nM-1}), (\Phi_{nM+1} - \Phi_{nM}) \cdots (\Phi_{nM+(M-1)} - \Phi_{nM+(M-2)})]^T$ $\rho_n$ is a user defined parameter, and $p_n$ is chosen among the following values:
  i. $p_n = 1$,
  ii. $p_n = q_0$, and
  iii. $p_n = r_n \odot q_0$, with $r_n$ is equal to one chosen among $|y_n|$ and a user defined constant.

Optionally, one or more embodiments of the invention may have one or more of the following facultative features that can be used separately or in combination.

According to an optional embodiment of the first aspect of the invention, the unknowns $\{\hat{h}^{(n)}, \hat{\omega}^{(n)}, \hat{\Phi}_0^{(n)}\}$ are as estimated by solving the system of three linear equations and/or as estimated in function of given values of said model parameters $\{h, \omega, \Phi_0\}$.

According to another optional embodiment of the first aspect of the invention, said sequence of symbols $\{â_n\}$ comprises at least one among a sequence of presumed symbols and a sequence of symbols corresponding to samples $\{y_k\}$ of the received RF signal. Said presumed symbols may be chosen among training symbols and a sequence of received symbols as detected According to another optional embodiment of the first aspect of the invention, said continuous phase modulation is a Gaussian Frequency-Shift Keying (GFSK) modulation.

According to another aspect, one or more embodiments of the invention also relate to a decoder for decoding an RF signal bearing a sequence of transmitted symbols modulated by using continuous phase modulation. The decoder comprises a phase extractor, an estimator of model parameters $\{h, \omega, \Phi_0\}$, a symbol detector, and a demultiplexer, designed altogether for implementing the method as introduced above.

According to another aspect, one or more embodiments of the invention further relate to a computer-program product that contains software program instructions, where execution of the software program instructions by at least one data processor results in performance of operations that comprise execution of the method as introduced above.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Herein a system of equations may be defined as a finite set of equations for which common solutions exist.

The term "training symbol" denotes a symbol making part of the sequence of symbols to be retrieved at the level of the receiver and already known by the receiver.

Figure 1:
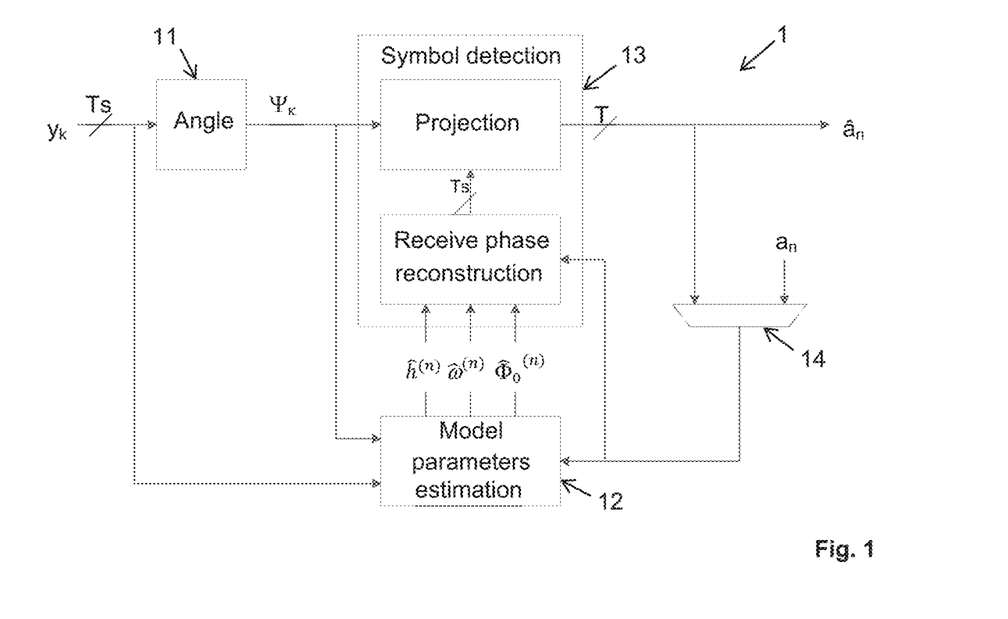
FIG. 1 show a top-level block diagram of a receiver according to an embodiment of one aspect of the invention.

FIG. 1 shows an example architecture of a receiver 1 designed for implementing the decoding method according to the first aspect of the invention.

As shown in FIG. 1, such architecture may comprise at least:
  A phase extractor 11 depicted by the "angle" block,
  An estimator 12 of the model parameters $\{h, \omega, \Phi_0\}$ depicted by the "Model parameters estimation" block,
  A symbol detector 13 depicted by the "Symbol detection" block, and
  A demultiplexer 14 depicted by a trapezoid.

The phase extractor 11 is designed for extracting the instantaneous phase $\Psi_k$ of each sample $y_k$ of the sampled RF signal.

The estimator 12 is designed for estimating parameters $\{h, \omega, \Phi_0\}$ of a set of parameters among which a first parameter h characterizing a modulation index, a second parameter co characterizing a carrier frequency offset and a third parameter (Do characterizing an initial phase offset. These three parameters are called model parameters $\{h, \omega, \Phi_0\}$. They are estimated by solving a system of three linear equations whose:
  a. three unknowns $\{\hat{h}^{(n)}, \hat{\omega}^{(n)}, \hat{\Phi}_0^{(n)}\}$ are respectively function of said model parameters $\{h, \omega, \Phi_0\}$, and
  b. coefficients $\{B^{(n)}, C^{(n)}, D^{(n)}, F^{(n)}, G^{(n)}, H^{(n)}, v^{(n)}, v_1^{(n)}, v_2^{(n)}, v_3^{(n)},\}$ are computed in a recursive way in function of:
    i. a sequence of symbols $\{â_n\}$ corresponding to the sequence of transmitted symbols up to time nT, and
    ii. measured phases $\{\Psi_k\}$ of samples $\{y_k\}$ of the RF signal received from time (n–1)T to time nT.

The symbol detector 13 is designed for detecting, within the received RF signal, received symbols corresponding to said transmitted symbols of the sequence. Its fundamental task is to reliably recover the transmitted symbols from the received RF signal.

More particularly, the symbol detector 13 detects an $(m+1)^{th}$ received symbol by:
  computing a predicted phase $\Gamma_m$ of the RF signal received from time mT to time (m+1)T in function of a sequence of $\{â_m\}$ corresponding to the sequence of transmitted symbols up to time mT and in function of the unknowns $\{\hat{h}^{(n)}, \hat{\omega}^{(n)}, \hat{\Phi}_0^{(n)}\}$ as estimated at time mT, then
  computing an error term between a vector $\Psi_m$ of the measured phases $\{\Psi_k\}$ and said predicted phase $\Gamma_m$ in order to match both phases.

Said measured phases $\{\Psi_k\}$ have been extracted from the received RF signal by said phase extractor 11. More particularly, the phase extractor 11 measures phases $\{\Psi_k\}$ of samples $\{y_k\}$ of the RF signal received from time mT to time (m+1)T, for the symbol detector 13 to detect the $(m+1)^{th}$ received symbol.

The symbol detector 13 is more particularly be comprised of a phase reconstructor depicted by the "Receive phase reconstruction" block and a comparator depicted by the "Projection" block, on FIG. 1.

The phase reconstructor of the symbol detector 13 is designed for reconstructing the phase that a received symbol is presumed to have according to the model parameters $\{h, \omega, \Phi_0\}$ as estimated by the estimator 12. It computes said predicted phase $\Gamma_m$.

The comparator of the symbol detector 13 is designed for comparing:
  the vector $\Psi_m$ of the measured phases $\{\Psi_k\}$ and
  said predicted phase $\Gamma_m$.
Owing to such a comparison, an error term is computed that characterizes the mismatch or rather the level of matching of both phases.

The estimator 12 of the model parameters $\{h, \omega, \Phi_0\}$ has been more particularly derived by maximizing, with some approximations, the likelihood criterion below:

$$L(h, \omega, \Phi_0) = -\frac{1}{\sigma^2} \exp\left(-\frac{1}{\sigma^2} \sum_{k=1}^{nM} |y_k - A\exp(j(\Phi_k(h) + \Phi_0 + \omega k T_s))|^2\right),$$

where, as already introduced above:

$$\Phi_k(h) = \pi h \hat{\delta}_{n-L} + 2\pi h \Sigma_{i=0}^{L-1} \hat{a}_{n-i} q(kTs - (n-i)T)$$
for $nM \leq k \leq (n+1)M$, and $$\hat{\delta}_{n-L} = \sum_{i=0}^{n-L} \hat{a}_i$$

and assuming that the set $\{\hat{a}_i\}$ up till time nT are known as estimates of the symbols $\{a_i\}$.

More particularly, assuming that:
i. the signal-to-noise ratio is sufficiently moderate, and
ii. the RF signal is a constant amplitude signal, with this assumption being notably fulfilled when the RF signal bears a sequence of symbols modulated by using CPM, the estimate at time nT of the model parameters $\{h, \omega, \Phi_0\}$ are computed with the following system of three linear equations:

$$\begin{bmatrix} \hat{\omega}^{(n)} \\ \hat{\Phi}_0^{(n)} \\ \hat{h}^{(n)} \end{bmatrix} = \begin{bmatrix} B^{(n)} & C^{(n)} & D^{(n)} \\ F^{(n)} & G^{(n)} & B^{(n)} \\ G^{(n)} & H^{(n)} & C^{(n)} \end{bmatrix}^{-1} \begin{bmatrix} v_1^{(n)} \\ v_2^{(n)} \\ v_3^{(n)} \end{bmatrix}$$

or, equivalently, with the expanded expressions:

$$\kappa^{(n)} = D^{(n)}F^{(n)}H^{(n)} + 2B^{(n)}C^{(n)}G^{(n)} - (B^{(n)}B^{(n)}H^{(n)} + C^{(n)}C^{(n)}F^{(n)} + G^{(n)}G^{(n)}D^{(n)})$$

$$\hat{h}^{(n)} = \frac{1}{\kappa^{(n)}} \begin{pmatrix} [F^{(n)}H^{(n)} - G^{(n)}G^{(n)}]v_1^{(n)} + \\ [C^{(n)}G^{(n)} - B^{(n)}H^{(n)}]v_2^{(n)} + \\ [B^{(n)}G^{(n)} - C^{(n)}F^{(n)}]v_3^{(n)} \end{pmatrix}$$

$$\hat{\omega}^{(n)} = \frac{1}{\kappa^{(n)}} \begin{pmatrix} [C^{(n)}G^{(n)} - B^{(n)}H^{(n)}]v_1^{(n)} + \\ [D^{(n)}H^{(n)} - C^{(n)}C^{(n)}]v_2^{(n)} + \\ [B^{(n)}C^{(n)} - D^{(n)}G^{(n)}]v_3^{(n)} \end{pmatrix}$$

$$\hat{\Phi}_0^{(n)} = \frac{1}{\kappa^{(n)}} \begin{pmatrix} [B^{(n)}G^{(n)} - C^{(n)}F^{(n)}]v_1^{(n)} + \\ [B^{(n)}C^{(n)} - D^{(n)}G^{(n)}]v_2^{(n)} + \\ [D^{(n)}F^{(n)} - B^{(n)}B^{(n)}]v_3^{(n)} \end{pmatrix}$$

where $\{\hat{h}^{(n)}, \hat{\omega}^{(n)}, \hat{\Phi}_0^{(n)}\}$ are the unknowns of the system and are respectively functions of said model parameters $\{h, \omega, \Phi_0\}$, and wherein the matrix coefficients can be computed in a recursive way as:

$B^{(n)} = \Sigma_{k \in I(n)} k\alpha_k r_k$ or $B^{(n)} = B^{(n-1)} + \Sigma_{k \in I(n) \setminus I(n-1)} k\alpha_k r_k$ $C^{(n)} = \Sigma_{k \in I(n)} \alpha_k r_k$ or $C^{(n)} = B^{(n-1)} + \Sigma_{k \in I(n) \setminus I(n-1)} \alpha_k r_k$ $D^{(n)} = \Sigma_{k \in I(n)} \alpha_k^2 r_k$ or $D^{(n)} = B^{(n-1)} + \Sigma_{k \in I(n) \setminus I(n-1)} \alpha_k^2 r_k$ $F^{(n)} = \Sigma_{k \in I(n)} k^2 r_k$ or $F^{(n)} = B^{(n-1)} + \Sigma_{k \in I(n) \setminus I(n-1)} k^2 r_k$ $G^{(n)} = \Sigma_{k \in I(n)} k r_k$ or $G^{(n)} = B^{(n-1)} + \Sigma_{k \in I(n) \setminus I(n-1)} k r_k$ $H^{(n)} = \Sigma_{k \in I(n)} |y_k|$ or $H^{(n)} = B^{(n-1)} + \Sigma_{k \in I(n) \setminus I(n-1)} |y_k|$ $v_1^{(n)} = \Sigma_{k \in I(n)} \alpha_k r_k \Psi_k$ or $v_1^{(n)} = v_1^{(n-1)} + \Sigma_{k \in I(n) \setminus I(n-1)} \alpha_k r_k \Psi_k$ $v_2^{(n)} = \Sigma_{k \in I(n)} k r_k \Psi_k$ or $v_2^{(n)} = v_2^{(n-1)} + \Sigma_{k \in I(n) \setminus I(n-1)} k r_k \Psi_k$ $v_3^{(n)} = \Sigma_{k \in I(n)} r_k \Psi_k$ or $v_3^{(n)} = v_3^{(n-1)} + \Sigma_{k \in I(n) \setminus I(n-1)} r_k \Psi_k$ where I(n) is a subset of indices between 0 and nM, $r_k$ should be equal to $|y_k|$, but could also be set a constant (for instance equal to 1, but preferably adapted in function of the signal-to-noise ratio), and $a_k$ is given by:

$$\alpha_k = \pi \Sigma_{i=0}^{n-L} \hat{a}_i + 2\pi \Sigma_{i=1}^{L-1} \hat{a}_{n-i} q(kT_s + iT - nT)$$
with $nM \leq k \leq (n+1)M$ Note that $\alpha_k$ can be viewed as a derivative of $\Phi_k(h)$ over h.

The demultiplexer 14 is used as usually within known decoders. It is used to switch from a training phase to a blind phase. During the training phase, the parameter estimation is done using a priori known transmitted symbols. In BT such a training phase happens for e.g., during the reception of the synchronization word which is known by the receiver. During the blind phase, the demodulator becomes a decision-directed algorithm.

The symbol detector 13 is more particularly designed for obtaining an estimation $b_{m+1}$ of the transmitted symbol $a_{m+1}$ by "comparing" the phase of the samples received during the time period [mT . . . (m+1)T] with some reconstructed/predicted phase computed from the a-priori knowledge of the previous symbols up till time mT and the model parameters estimates at time mT, according to the following proceedings.

Let's call $\Psi_n$ the vector of measured phases of the received signal, from time nT to (n+1)T:

$$\Psi_n = \text{angle}([y_{nM}, y_{nM+1}, \ldots, y_{nM+(M-1)}]^T) = [\Psi_{nM}, \Psi_{nM+1}, \ldots, \Psi_{nM+(M-1)}]^T$$

The parameter M is the oversampling factor. For instance, M=3. Note that according to the model described in the "background" section:

$$\Psi_n = h\delta_{n-L}\mathbf{1} + 2\pi h \sum_{i=0}^{L-1} a_{n-i} q_i + \Phi_0 \mathbf{1} + \omega c_n + \vartheta(\text{angle } (i_n + w_n))$$

where $c_n = [nM, nM+1, \ldots, nM+M-1]^T$ and $\theta()$ is a non-linear function.

The detection is performed in 2 steps.

First, the reconstruction block computes a predicted phase $\Gamma_n$ from the estimated sequence $\{\hat{a}_i\}$ up to time (n−1)T:

$$\Gamma_n = \pi \hat{h}^{(n)} \hat{\delta}_{n-L} \mathbf{1} + 2\pi \hat{h}^{(n)} \sum_{i=1}^{L-1} \hat{a}_{n-i} q_i + \hat{\Phi}_0^{(n)} + \hat{\omega}^{(n)} c_n, \text{ with}$$

$$\hat{\delta}_{n-L} = \sum_{i=0}^{n-L} \hat{a}_i = \hat{\delta}_{n-L-1} + \hat{a}_{n-L}$$

Then, the estimate $\hat{a}_n$ of symbol $a_n$ is obtained through the closed form equation below:

$$\hat{a}_n = \text{sign}(p_n^T [\Psi_n - \Gamma_n + \rho_n \Omega_n]).$$

The component $\rho_n \Omega_n$ serves as robust regularization to interference and transmit filters as this parameter penalizes the slope of the phase of the received RF signal. $\Omega_n$ contains the derivative of the measured phases, $\Omega_n = [(\Phi_{nM} - \Phi_{nM-1}), (\Phi_{nM+1} - \Phi_{nM}) \ldots (\Phi_{nM+(M-1)} - \Phi_{nM+(M-2)})]^T$ and $\rho_n$ is a user defined parameter.

$p_n$ is a projection vector. It can take different values such as:
  i. $p_n = 1$
  i. $p_n = q_0$
  iii. $p_n = r_n \odot q_0$
  where $\odot$ is the Hadamard operator and $r_n$ is equal to one chosen among $|y_n| = [y_{nM} y_{nM+1} \cdots y_{nM+(M-1)}]^T$ and a user defined constant.

The method according to the first aspect of the invention may begin by anyone of the estimation step(s) and the detection step(s) depending on the encountered context. Some example embodiments are briefly discussed below, that are not intended to be limiting.

If the first symbols of the transmitted sequence are already known at the level of the receiver, some estimating steps can be implemented first in order to achieve estimates of the model parameters, during what could be called a learning phase. As shown on FIG. 3, discussed below, few tenths of a priori known or training symbols may be sufficient for the method to converge towards good estimates of the model parameters. These latter can then serve for implementing the detecting steps, thus detecting reliably, i.e., with estimates of model parameters characterizing the real world anomalies, the symbols of the sequence which follow the training ones.

If the model parameters or estimates thereof are given or already known, for instance with reference to a previous decoding, the unknowns $\{\hat{h}^{(n)}, \hat{\omega}^{(n)}, \hat{\Phi}_0^{(n)}\}$ can be estimated in function of the given values of said model parameters or estimates and the method could be implemented by beginning with some detecting steps, with using the unknowns $\{\hat{h}^{(n)}, \hat{\omega}^{(n)}, \hat{\Phi}_0^{(n)}\}$ as estimated.

The method further allows for switching anytime and as often as needed/desired between estimation and detection steps. In this sense, symbols as previously detected can serve for a new estimation of the model parameters and the previously estimated model parameters can serve for detecting newly received symbols.

The method according to one or more embodiments is designed for decoding symbols coded by using the so-called CPM. Indeed, the assumptions made for reducing the likelihood criterion to the above given system of three linear equations is comprised of the assumption that the RF signal is a constant amplitude signal. This is the main or even the single assumption which could limit the choice of usable modulation schemes. In other words, any modulation scheme that achieves a constant amplitude signal, such as the GFSK one, may be used. Indeed, a very efficient and robust decoder is hereby provided which is resilient enough to decode GFSK signals in the presence of interference and synchronization errors. Others modulation schemes, such as the one known as OQPSK modulation and the one known as MSK modulation, should also be usable.

From a complexity point of view, a rigorous complexity analysis shows that our algorithm operates in linear time, i.e., $O(n)$, as neither exhaustive searches, nor expensive matrix decompositions (such as EVD, SVD, QR, LU, RRQR, Jordan, Schur, or the like) is required.

The proposed method according to an embodiment also has a very low latency when compared to other near-optimal methods. These are key differentiators compared to the existing advanced GFSK decoder, which are usually based on Viterbi algorithm.

Figure 2:
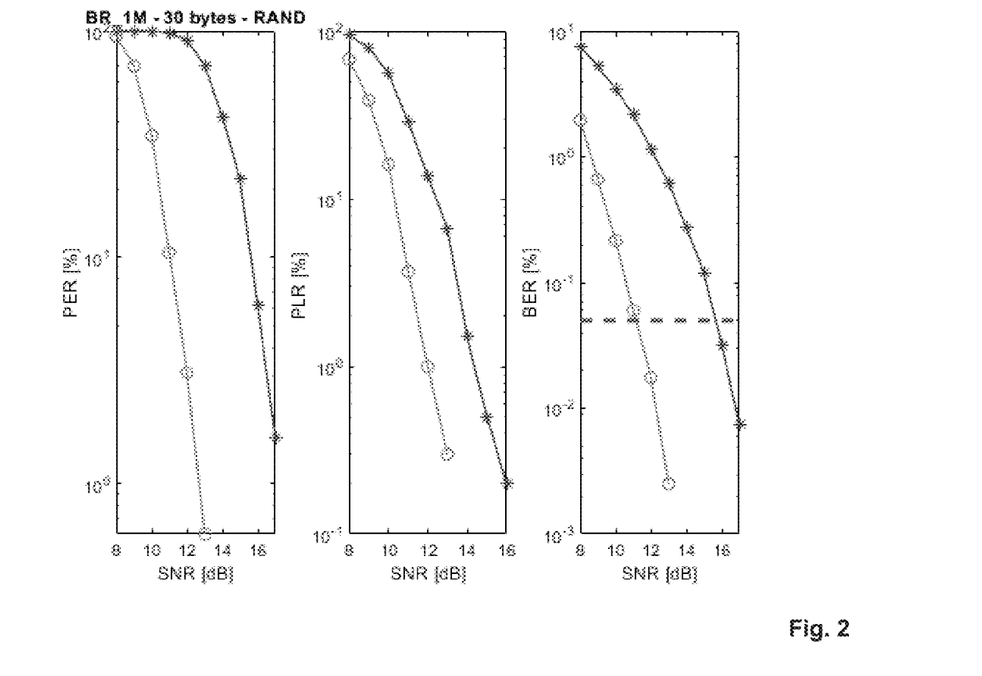
FIG. 2 shows three graphs given, as simulation results, the Packet Error Rate (PER), Packet Loss Rate (PLR) and the Bit Error Rate (BER) as a function of Signal-to-Noise Ratio (SNR) on a log scale for a Bluetooth BR transmission with frames containing 30 bytes, the curves with stars have been obtained for a reference LDI decoder and the curves with rings have been obtained for the here proposed decoder according to an embodiment.

FIG. 2 gives the Packet Error Rate (PER), the Packet Loss Rate (PLR), and the Bit Error Rate (BER) as a function of the Signal-to-Noise Ratio (SNR) on a log scale for a Bluetooth BR transmission. The curves with stars have been obtained for a reference LDI decoder and the curves with rings have been obtained for the here proposed decoder. One can see a performance gain of more than 4 dB of the proposed decoder compared to the LDI.

Figure 3:
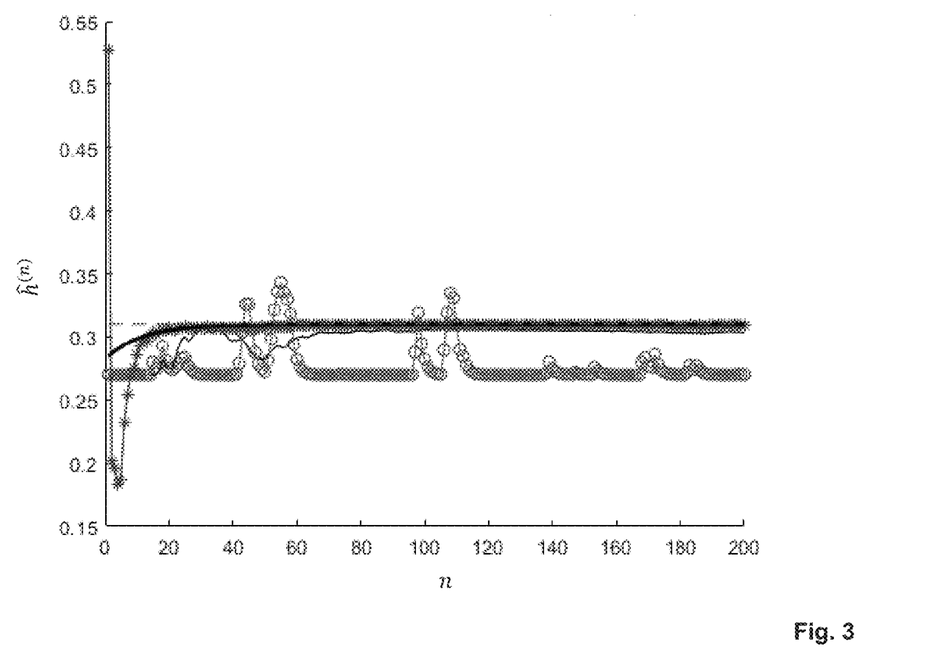
FIG. 3 shows a graph of the evolutions of $h^{(k)}$ in function of the number of bits received at the decoder for multiple decoding methods, including the proposed one (See the curve with stars).

From FIG. 3, with a simulated experiment generating random GFSK bits and a true h value being chosen to be 0.31, we can see the evolution of $h^{(k)}$ using multiple methods among which is the here proposed one (See curve with stars). It appears that the latter is the closest to the optimal (See continuous bold line). Furthermore note that the proposed method gives more accurate estimates in the range $k \in [10, 30]$ than the optimal brute force, this seems to be due to the nature of the proposed method, as it is search-free and grid-less, whereas the optimal value of $h^{(k)}$ comprises of an exhaustive search on a discretized grid, and hence is faced with gridding errors; indeed, a smaller grid size would yield a better performance, however, simulations would be much slower. In fact, the chosen step size in this experiment, which is small enough, already suffers from a very slow exponential time complexity, whereas the proposed one is linear.

We see that the estimator 12 of the decoder 1 according to the second aspect of the invention enjoys good statistical properties, such as unbiasedness, sufficient statistics, variance (and thus MSE) reduction at each bit reception, and density function convergence per estimate. This means that the longer the transmit frame is (in terms of bits/bytes), the more reliable the estimator 12 is going to be.

The foregoing description has provided, by way of exemplary and non-limiting examples, a full and informative description of the decoding method according to the invention. However, various modifications and adaptations may become apparent to those skilled in the relevant arts in view of the foregoing description, when read in conjunction with the accompanying drawings and the appended claims. As but some examples, the use of other similar or equivalent algorithms and data representations may be attempted by those skilled in the art. Further, the various names used for the different elements, variables and functions (e.g. symbol detector, presumed symbol, angle( )) are merely descriptive and are not intended to be read in a limiting sense, as these various elements, variables and functions can be referred to by any suitable names. All such and similar modifications of the teachings of this invention will still fall within the scope of the claims of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

The invention claimed is:

1. A method for decoding an RF signal bearing a sequence of transmitted symbols modulated by using continuous phase modulation, the method comprising, at the level of a receiver (1) of said RF signal:
   estimating model parameters $\{h, \omega, \Phi_0\}$ among which a first parameter h characterizing a modulation index, a second parameter $\omega$ characterizing a carrier frequency offset and a third parameter $\Phi_0$ characterizing an initial phase offset, and
   detecting, within the received RF signal, received symbols corresponding to said transmitted symbols of the sequence,
   wherein, at time nT where T is a symbol duration and $n \in \mathbb{N}$, the model parameters $\{h, \omega, \Phi_0\}$ are estimated by solving a system of three linear equations whose:

a. three unknowns $\{\hat{h}^{(n)}, \hat{\omega}^{(n)}, \hat{\Phi}_0^{(n)}\}$ are respectively functions of said model parameters $\{h, \omega, \Phi_0\}$, and
b. coefficients $\{B^{(n)}, C^{(n)}, D^{(n)}, F^{(n)}, G^{(n)}, H^{(n)}, v_1^{(n)}, v_2^{(n)}, v_3^{(n)}\}$ are computed in a recursive way in function of:
  i. a sequence of symbols $\{\hat{a}_n\}$ corresponding to the sequence of transmitted symbols up to time nT, and
  ii. measured phases $\{\Psi_k\}$ of samples $\{y_k\}$ of the RF signal received from time (n−1)T to time nT.

2. The method according to claim 1, wherein, in accordance with the formalism as introduced into the "background" part, the system of three linear equations is in the following matrix form:

$$\begin{bmatrix} \hat{\omega}^{(n)} \\ \hat{\Phi}_0^{(n)} \\ \hat{h}^{(n)} \end{bmatrix} = \begin{bmatrix} B^{(n)} & C^{(n)} & D^{(n)} \\ F^{(n)} & G^{(n)} & B^{(n)} \\ G^{(n)} & H^{(n)} & C^{(n)} \end{bmatrix}^{-1} \begin{bmatrix} v_1^{(n)} \\ v_2^{(n)} \\ v_3^{(n)} \end{bmatrix}$$

with the matrix coefficients being in the form:

$B^{(n)} = \Sigma_{k \in I(n)} k\alpha_k r_k$ or $B^{(n)} = B^{(n-1)} + \Sigma_{k \in I(n) \setminus I(n-1)} k\alpha_k r_k$ $C^{(n)} = \Sigma_{k \in I(n)} \alpha_k r_k$ or $C^{(n)} = B^{(n-1)} + \Sigma_{k \in I(n) \setminus I(n-1)} \alpha_k r_k$ $D^{(n)} = \Sigma_{k \in I(n)} \alpha_k^2 r_k$ or $D^{(n)} = B^{(n-1)} + \Sigma_{k \in I(n) \setminus I(n-1)} \alpha_k^2 r_k$ $F^{(n)} = \Sigma_{k \in I(n)} k^2 r_k$ or $F^{(n)} = B^{(n-1)} + \Sigma_{k \in I(n) \setminus I(n-1)} k^2 r_k$ $G^{(n)} = \Sigma_{k \in I(n)} k r_k$ or $G^{(n)} = B^{(n-1)} + \Sigma_{k \in I(n) \setminus I(n-1)} k r_k$ $H^{(n)} = \Sigma_{k \in I(n)} |y_k|$ or $H^{(n)} = B^{(n-1)} + \Sigma_{k \in I(n) \setminus I(n-1)} |y_k|$ $v_1^{(n)} = \Sigma_{k \in I(n)} \alpha_k r_k \Psi_k$ or $v_1^{(n)} = v_1^{(n-1)} + \Sigma_{k \in I(n) \setminus I(n-1)} \alpha_k r_k \Psi_k$ $v_2^{(n)} = \Sigma_{k \in I(n)} k r_k \Psi_k$ or $v_2^{(n)} = v_2^{(n-1)} + \Sigma_{k \in I(n) \setminus I(n-1)} k r_k \Psi_k$ $v_3^{(n)} = \Sigma_{k \in I(n)} r_k \Psi_k$ or $v_3^{(n)} = v_3^{(n-1)} + \Sigma_{k \in I(n) \setminus I(n-1)} r_k \Psi_k$ where I(n) is a subset of indices between O and nM, $r_k$ is equal to one chosen among $|y_k|$ and a user defined constant, and $\alpha_k$ is in the form:

$\alpha_k = \pi \Sigma_{i=0}^{n-L} \hat{a}_i + 2\pi \Sigma_{i=1}^{L-1} \hat{a}_{n-i} q(kT_s + iT - nT)$
with $nM \leq k \leq (n+1)M$.

3. The method according to claim 1, wherein an $(m+1)^{th}$ received symbol is detected by:
computing a predicted phase $\Gamma_m$ of the RF signal received from time mT to time (m+1)T in function of a sequence of $\{\hat{a}_m\}$ corresponding to the sequence of transmitted symbols up to time mT and in function of the unknowns $\{\hat{h}^{(n)}, \hat{\omega}^{(n)}, \hat{\Phi}_0^{(n)}\}$ as estimated at time mT, and
measuring phases $\{\Psi_k\}$ of samples $\{y_k\}$ of the RF signal received from time mT to time (m+1)T, then
computing an error between a vector $\Psi_m$ of the measured phases $\{\Psi_k\}$ and said predicted phase $\Gamma_m$ in order to match both phases.

4. The method according to claim 3, wherein, in accordance with the formalism as introduced into the "background" part:

a. the predicted phase $\Gamma_n$ is in the following form:

$$\Gamma_n = \pi \hat{h}^{(n)} \hat{\delta}_{n-L} 1 + 2\pi \hat{h}^{(n)} \sum_{i=1}^{L-1} \hat{a}_{n-i} q_i + \hat{\Phi}_0^{(n)} + \hat{\omega}^{(n)} c_n, \text{ with}$$

$$\hat{\delta}_{n-L} = \sum_{i=0}^{n-L} \hat{a}_i = \hat{\delta}_{n-L-1} + \hat{a}_{n-L}$$

b. The $n^{th}$ received symbol as detected is given by:
$\hat{a}_n = \text{sign}(p_n^T [\Psi_n - \Gamma_n + \rho_n \Omega_n])$
where:
$\Psi_n = \text{angle}([y_{nM} \; y_{nM+1} \cdots y_{nM+(M-1)}]^T) = [\Psi_{nM} \; \Psi_{nM+1} \cdots \Psi_{nM+(M-1)}]^T$,
$\Omega_n = [(\Phi_{nM} - \Phi_{nM-1}), (\Phi_{nM+1} - \Phi_{nM}) \cdots (\Phi_{nM+(M-1)} - \Phi_{nM+(M-2)})]^T$
$\rho_n$ is a user defined parameter, and
$p_n$ is chosen among the following values:
  i. $p_n = 1$,
  ii. $p_n = q_0$, and
  iii. $p_n = r_n \odot q_0$, with $r_n$ is equal to one chosen among $|y_n|$ and a user defined constant.

5. The method according to claim 1, wherein the unknowns $\{\hat{h}^{(n)}, \hat{\omega}^{(n)}, \hat{\Phi}_0^{(n)}\}$ are as estimated by solving the system of three linear equations and/or as estimated in function of given values of said model parameters $\{h, \omega, \Phi_0\}$.

6. The method according to claim 1, wherein said sequence of symbols $\{\hat{a}_n\}$ comprises at least one among a sequence of presumed symbols and a sequence of symbols corresponding to samples $\{y_k\}$ of the received RF signal.

7. The method according to claim 6, wherein said presumed symbols are chosen among training symbols and a sequence of received symbols as detected.

8. The method according to claim 1, wherein said continuous phase modulation is based on Gaussian Frequency-Shift Keying (GFSK).

9. A decoder for decoding an RF signal bearing a sequence of transmitted symbols modulated by using continuous phase modulation, the decoder comprising a phase extractor, an estimator of model parameters $\{h, \omega, \Phi_0\}$, a symbol detector, and a demultiplexer, designed altogether for implementing the method according to claim 1.

10. A computer-program product comprising software program instructions stored in a non-transitory computer readable medium, where execution of the software program instructions by at least one data processor results in performance of operations that comprise execution of the method according to claim 1.

11. The method according to claim 2, wherein an $(m+1)^{th}$ received symbol is detected by:
computing a predicted phase $\Gamma_m$ of the RF signal received from time mT to time (m+1)T in function of a sequence of $\{\hat{a}_m\}$ corresponding to the sequence of transmitted symbols up to time mT and in function of the unknowns $\{\hat{h}^{(n)}, \hat{\omega}^{(n)}, \hat{\Phi}_0^{(n)}\}$ as estimated at time mT, and
measuring phases $\{\Psi_k\}$ of samples $\{y_k\}$ of the RF signal received from time mT to time (m+1)T, then
computing an error between a vector $\Psi_m$ of the measured phases $\{\Psi_k\}$ and said predicted phase $\Gamma_m$ in order to match both phases.

12. The method according to claim 2, wherein the unknowns $\{\hat{h}^{(n)}, \hat{\omega}^{(n)}, \hat{\Phi}_0^{(n)}\}$ are as estimated by solving the system of three linear equations and/or as estimated in function of given values of said model parameters $\{h, \omega, \Phi_0\}$.

13. The method according to claim 3, wherein the unknowns $\{\hat{h}^{(n)}, \hat{\omega}^{(n)}, \hat{\Phi}_0^{(n)}\}$ are as estimated by solving the system of three linear equations and/or as estimated in function of given values of said model parameters $\{h, \omega, \Phi_0\}$.

14. The method according to claim 4, wherein the unknowns $\{\hat{h}^{(n)}, \hat{\omega}^{(n)}, \hat{\Phi}_0^{(n)}\}$ are as estimated by solving the system of three linear equations and/or as estimated in function of given values of said model parameters $\{h, \omega, \Phi_0\}$.

15. The method according to claim 2, wherein said sequence of symbols $\{\hat{a}_n\}$ comprises at least one among a sequence of presumed symbols and a sequence of symbols corresponding to samples $\{y_k\}$ of the received RF signal.

16. The method according to claim 3, wherein said sequence of symbols $\{\hat{a}_n\}$ comprises at least one among a sequence of presumed symbols and a sequence of symbols corresponding to samples $\{y_k\}$ of the received RF signal.

17. The method according to claim 4, wherein said sequence of symbols $\{\hat{a}_n\}$ comprises at least one among a sequence of presumed symbols and a sequence of symbols corresponding to samples $\{y_k\}$ of the received RF signal.

18. The method according to claim 5, wherein said sequence of symbols $\{\hat{a}_n\}$ comprises at least one among a sequence of presumed symbols and a sequence of symbols corresponding to samples $\{y_k\}$ of the received RF signal.

19. The method according to claim 2, wherein said continuous phase modulation is based on Gaussian Frequency-Shift Keying (GFSK).

20. The method according to claim 3, wherein said continuous phase modulation is based on Gaussian Frequency-Shift Keying (GFSK).

* * * * *